(12) United States Patent
Sato et al.

(10) Patent No.: US 8,991,994 B2
(45) Date of Patent: Mar. 31, 2015

(54) INK PACK

(71) Applicant: FUJIFILM Corporation, Tokyo (JP)

(72) Inventors: Takehiko Sato, Kanagawa (JP);
Kenjirou Araki, Kanagawa (JP);
Takashi Komiyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/014,281

(22) Filed: Aug. 29, 2013

(65) Prior Publication Data

US 2014/0063149 A1  Mar. 6, 2014

(30) Foreign Application Priority Data

Aug. 31, 2012  (JP) .................... 2012-192606

(51) Int. Cl.
*G01D 11/00* (2006.01)
*B41J 2/175* (2006.01)
*B41J 2/01* (2006.01)

(52) U.S. Cl.
CPC .......... *B41J 2/17503* (2013.01); *B41J 2/17513* (2013.01); *B41J 2002/17516* (2013.01)
USPC .............................. 347/100; 347/86; 347/102

(58) Field of Classification Search
CPC ............... B41J 2/17513; B41J 2/17553; B41J 2/17503; B41J 2002/17516
USPC .......................................... 347/86, 100, 102
See application file for complete search history.

(56) References Cited

U.S. PATENT DOCUMENTS

| | | |
|---|---|---|
| 2006/0092244 A1 | 5/2006 | Nakajima |
| 2007/0225397 A1 | 9/2007 | Nasvadba et al. |
| 2007/0229612 A1 | 10/2007 | Oyanagi et al. |
| 2010/0255211 A1 | 10/2010 | Kawashima et al. |
| 2011/0319535 A1 | 12/2011 | Nesvadba et al. |
| 2012/0083545 A1 | 4/2012 | Kida et al. |

FOREIGN PATENT DOCUMENTS

| | | |
|---|---|---|
| JP | 2000-319308 A | 11/2000 |
| JP | 2008-511714 A | 4/2008 |
| JP | 2009-073945 A | 4/2009 |
| JP | 2009-096985 A | 5/2009 |
| JP | 2009-197194 A | 9/2009 |
| JP | 2010-070754 A | 4/2010 |
| JP | 2010-241894 A | 10/2010 |
| JP | 2012-092291 A | 5/2012 |
| JP | 2012-140490 A | 7/2012 |

OTHER PUBLICATIONS

The extended European search report issued on Feb. 10, 2014, which corresponds to European Patent Application No. 13182378.3-1701 and is related to U.S. Appl. No. 14/014,281.

(Continued)

*Primary Examiner* — Jannelle M Lebron
(74) *Attorney, Agent, or Firm* — Studebaker & Brackett PC

(57) ABSTRACT

An ink pack is a laminate pack which at least one layer of an aluminum layer or an aluminum alloy layer and at least one layer of a plastic layer are laminated. An ultraviolet curable type inkjet ink composition which contains a compound having a nitroxyl radical, and has $1.2 \times 10^{16}$ to $3.0 \times 10^{19}$ of the spin number of the nitroxyl radical in one milliliter of the ink composition, is sealed in the ink pack.

15 Claims, 1 Drawing Sheet

(56) References Cited

OTHER PUBLICATIONS

An Office Action; "Notice of Reasons for Rejection," issued by the Japanese Patent Office on Sep. 2, 2014, which corresponds to Japanese Patent Application No. 2012-192606 and is related to U.S. Appl. No. 14/014,281; with English language translation.

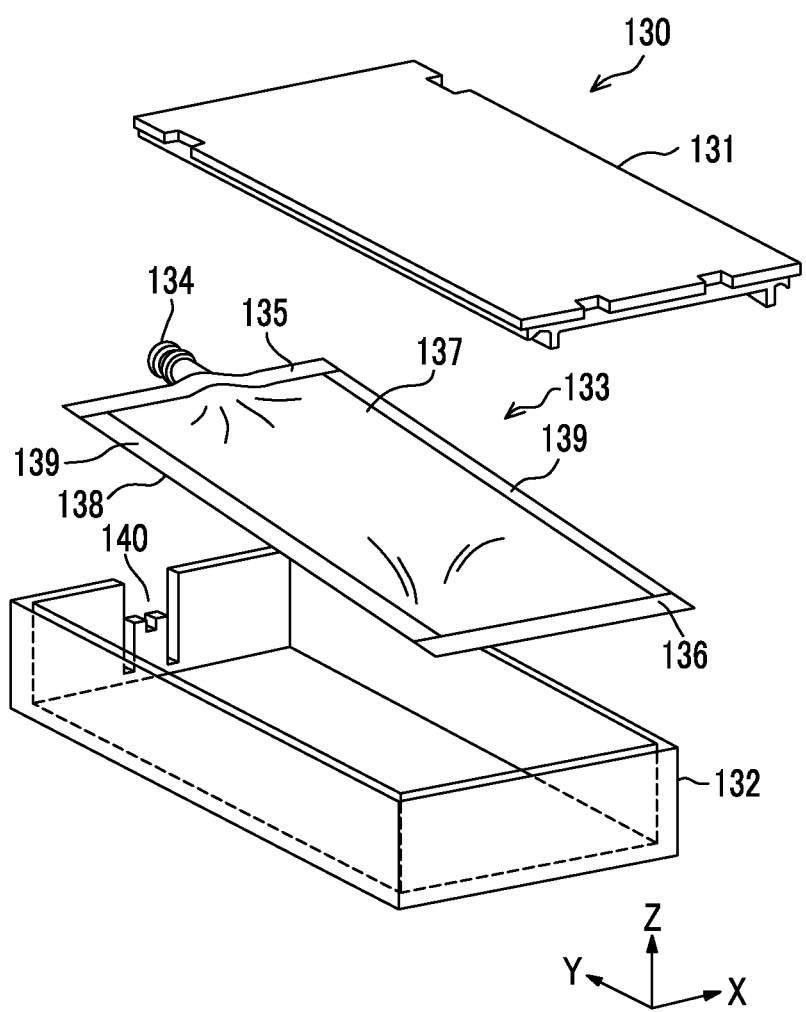

INK PACK

BACKGROUND OF THE INVENTION

1. Field of the Invention

The present invention relates to an ink pack.

2. Description of the Related Art

As image recording methods which form images on a recording medium such as paper based on image data signals, there are electrophotographic systems, sublimation type and fusion type thermal transfer systems, and inkjet systems.

It is possible for inkjet systems to efficiently use ink compositions and the running costs are low, particularly in cases of small lot production, since the printing apparatuses are not expensive and the ink compositions are ejected onto only the necessary image portion to directly form an image on the recording medium without the need for a plate during the printing. Furthermore, inkjet systems make little noise and are excellent as image recording systems, thereby attracting much attention in recent years.

Among these, a system using an ink composition for inkjet recording which is curable by irradiation with radiation such as ultraviolet rays (a radiation-curable type inkjet recording ink composition) is an excellent system from the points of view that the drying property is excellent in comparison with solvent-based ink compositions since the majority of the components of the ink composition are cured by the irradiation with radiation such as ultraviolet rays and that it is possible to print onto various types of recording media since the images do not run easily.

In addition, those described in JP2012-92291A and JP2000-319308A are known as resin compositions of the related art.

JP2012-92291A describes an ultraviolet curable inkjet ink composition which includes a monomer A which is represented by the following general Formula (I); a (meth)acrylated amine compound; a hindered amine compound other than the (meth)acrylated amine compound; and a photopolymerization initiator.

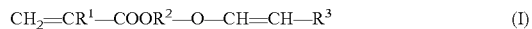

$$CH_2=CR^1—COOR^2—O—CH=CH—R^3 \quad (I)$$

(In the formula, $R^1$ is a hydrogen atom or a methyl group, $R^2$ is a divalent organic residue with a carbon number of 2 to 20, and $R^3$ is a hydrogen atom or an organic monovalent residue with a carbon number of 1 to 11.);

JP2000-319308A describes an active energy ray-curable resin composition which contains (a) a polymerizable oligomer, (b) N-vinyl formamide, and (c) a 2,2,6,6-tetramethylpiperidine-N-oxyl compound derivative.

SUMMARY OF THE INVENTION

An object of the present invention is to provide an ink pack where an ink composition with excellent curability and character reproducibility is sealed.

The above-described object is achieved by an ink pack according to the following <1>. <2> to <15>, which are preferable embodiments, are also described below.

<1> An ink pack, where an ultraviolet curable type inkjet ink composition which contains a compound having a nitroxyl radical, and has $1.2 \times 10^{16}$ to $3.0 \times 10^{19}$ of the spin number of the nitroxyl radical in one milliliter of the ink composition, is sealed in a pack where at least one layer of an aluminum layer or an aluminum alloy layer and at least one layer of a plastic layer are laminated.

<2> The ink pack according to the above-described <1>, where the ink composition includes an acyl phosphine-based photopolymerization initiator.

<3> The ink pack according to the above-described <1> or <2>, where the ink composition includes at least one of compound selected from a group consisting of N-vinyl lactams and (meth)acrylamides.

<4> The ink pack according to any one of the above-described <1> to <3>, where the ink composition includes at least one of compound selected from a group consisting of N-vinyl caprolactam and N-isopropyl acrylamide.

<5> The ink pack according to the above-described <4>, where the total content of the N-vinyl caprolactam and N-isopropyl acrylamide in the ink composition is 15 mass % or more with respect to the total mass of the ink composition.

<6> The ink pack according to any one of the above-described <1> to <5>, where the compound having the nitroxyl radical in the ink composition includes 4-hydroxy-2,2,6,6-tetramethyl piperidinyl-N-oxyl.

<7> The ink pack according to the above-described <6>, where the content of the 4-hydroxy-2,2,6,6-tetramethyl piperidinyl-N-oxyl in the ink composition is 0.05 to 1 mass % with respect to the total mass of the ink composition.

<8> The ink pack according to any one of the above-described <1> to <7>, where a material of a surface in direct contact with the ink composition of the ink pack is polypropylene or polyethylene.

<9> The ink pack according to any one of the above-described <1> to <8>, where an average oxygen amount in one milliliter of the ink composition after the ink composition is sealed in the ink pack and stored at 20° C. to 30° C. for 30 days or more is 20 μg or less.

<10> The ink pack according to any one of the above-described <1> to <9>, where an average oxygen amount in one milliliter of the ink composition after the ink composition is sealed in the ink pack for 1 day is 35 μg or less.

<11> The ink pack according to any one of the above-described <1> to <10>, where the ink composition includes copper phthalocyanine.

<12> The ink pack according to any one of the above-described <1> to <11>, which is an oxygen impermeable ink pack.

<13> The ink pack according to any one of the above-described <1> to <12>, where the ink composition includes a compound represented by the following Formula (b-2).

[Chem. 1]

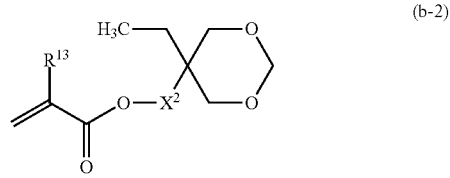

(b-2)

In the Formula (b-2), $R^{13}$ represents a hydrogen atom or a methyl group, and $X^2$ represents a single bond or a divalent linking group.

<14> The ink pack according to any one of the above-described <1> to <13>, where the ink composition includes an oligomer.

<15> The ink pack according to the above-described <14>, where the oligomer is urethane (meth)acrylate.

According to the present invention, it is possible to provide an ink pack where an ink composition with excellent curability and character reproducibility is sealed

BRIEF DESCRIPTION OF THE DRAWINGS

FIG. 1 is an exploded perspective view which shows an example of an ink cartridge which is able to be suitably used in the present invention.

DESCRIPTION OF THE PREFERRED EMBODIMENTS

Below, detailed description will be given of the present invention.

Here, in the present specification, the description of "xx to yy" represents a numerical range which includes xx and yy.

"(Meth)acrylate" and the like has the same meaning as "acrylate and/or methacrylate" and the same applies below.

In addition, in the present invention, "mass %" and "weight %" have the same meaning and "parts by mass" and "parts by weight" have the same meaning.

(Ink Pack)

In the ink pack (also referred to as an "ink container" or a "ink storage vessel") of the present invention, an ultraviolet curable type inkjet ink composition, which contains a compound having a nitroxyl radical, and has $1.2 \times 10^{16}$ to $3.0 \times 10^{19}$ of the spin number of the nitroxyl radical in one milliliter of the ink composition, is sealed in a pack where at least one layer of an aluminum layer or an aluminum alloy layer and at least one layer of a plastic layer are laminated.

The present inventors found that, in a case where the ultraviolet curable type inkjet ink composition is sealed in the ink pack, changes are generated in the physical properties of the ink such as viscosity due to dark polymerization and the character reproducibility is remarkably deteriorated particularly when characters are recorded by an inkjet printer. In addition, the present inventors found that even when, for example, a nitroso-based polymerization inhibitor is added to the ink composition in order to suppress the dark polymerization, the character reproducibility is deteriorated. Furthermore, when a large amount of the polymerization inhibitor is used in order to suppress the dark polymerization, the curability is deteriorated in such a case.

As a result of detailed research carried out by the present inventors, it was found that by setting an ink pack in which an ultraviolet curable type inkjet ink composition, which contains a compound having a nitroxyl radical, and has the spin number of the nitroxyl radical which is set to a specific range, is sealed, the ink composition has excellent curability and character reproducibility even in a case where an ink pack in which an aluminum layer and/or an aluminum alloy layer where dark polymerization occurs easily and a plastic layer are laminated is used.

Although the detailed mechanism by which the effect of the present invention is realized is not clear, in a case where the compound having the nitroxyl radical is used as the polymerization inhibitor, even when the radicals which are generated by a dark reaction in the ink composition are captured and deactivated, it is thought that the nitroxyl radical in the ink pack are reproduced, perhaps due to trace amounts of dissolved oxygen in the ink composition, and that it is possible to suppress the dark polymerization for a long period.

Below, detailed description will be given of the present invention in order of the ink composition and the configuration of the ink pack.

<Ultraviolet Curable Type Inkjet Ink Composition>

In the ink pack of the present invention, an ultraviolet curable type inkjet ink composition (also referred to simply as "ink composition" or "ink"), which contains a compound having a nitroxyl radical in the ink composition of one millimeter, and has $1.2 \times 10^{16}$ to $3.0 \times 10^{19}$ of the spin number of the nitroxyl radical, is sealed.

The ink composition which is able to be used in the present invention is an oil-based ink composition which is curable by ultraviolet light.

In addition, since the ink composition which is able to be used in the present invention is cured after application of the ink composition onto the recording medium, the ink composition is preferably a non-solvent which does not include a highly volatile solvent. This is because, when the highly volatile solvent remains in the cured ink image, the solvent resistance is deteriorated and there is a problem with a VOC (Volatile Organic Compound) in the remaining solvent. The content of the solvent with respect to the total mass of the ink composition is preferably 5 mass % or less, more preferably 3 mass % or less, even more preferably 1 mass % or less, and most preferably zero.

In addition, the ink composition which is able to be used in the present invention is preferably a radical polymerizable ink composition.

Furthermore, the ink composition which is able to be used in the present invention is preferably a cyan ink composition.

For the ink composition which is sealed in the ink pack of the present invention, the spin number of the nitroxyl radical in one milliliter of the ink composition is $1.2 \times 10^{16}$ to $3.0 \times 10^{19}$, preferably $2.0 \times 10^{16}$ to $3.0 \times 10^{19}$, and more preferably $1.0 \times 10^{17}$ to $3.0 \times 10^{19}$. Within the above-described ranges, the curability and the character reproducibility of the ink composition are superior.

As a method of measuring the spin number of the nitroxyl radical, measuring using electron spin resonance (ESR) is preferable. ESR measurement is a method for observing the inherent kinetic energy which is generated by unpaired electrons of the nitroxyl radical moving in rotation and the absorbance which is generated by the resonance of microwaves which are irradiated from the outside using a microwave oscillation apparatus. Specifically, preferable examples include the method of measuring the spin number of the nitroxyl radical which is described in "Electron Spin Resonance Method", (Masahiro Kono, Ohm Inc., p 119-160).

For the ink composition which is sealed in the ink pack of the present invention, the average oxygen amount (also referred to simply as "oxygen amount") in one milliliter of the ink composition is preferably 35 µg or less after 1 day sealed in the pack, more preferably 5 to 30 µg, even more preferably 10 to 25 µg, and particularly preferably 15 to 25 µg. With the above-described aspect, the curability and the character reproducibility of the ink composition are superior.

In addition, it is thought that, by including dissolved oxygen, it is possible for the ink composition which is sealed in the ink pack of the present invention to reproduce the nitroxyl radical where the radicals are captured and deactivated, as nitroxyl radical using oxygen.

In the ink composition which is sealed in the ink pack of the present invention, the average oxygen amount in one milliliter of the ink composition after being stored for 30 days or more at 20° C. to 30° C. with the ink composition sealed in the ink pack is preferably 20 µg or less, more preferably 5 to 19 µg, and even more preferably 10 to 18 µg. With the above-described aspect, the curability and the character reproducibility of the ink composition are superior.

Below, description will be given of the components which are contained in the ink composition.

(Component A) Compound Having a Nitroxyl Radical

The ink composition which is sealed in the ink pack of the present invention contains (component A) a compound having a nitroxyl radical.

As the compound having the nitroxyl radical, it is possible to preferably exemplify an N-oxyl compound.

The N-oxyl compound is not particularly limited as long as it is a compound which has an N-oxyl group (>N—O·), and it is possible to use well-known compounds (· represents a radical).

From the viewpoint of the stability of the compound itself, the N-oxyl compound is preferably an N-oxyl compound where a hindered amine compound is N-oxylated.

Preferable examples of the N-oxyl compound where a hindered amine compound is N-oxylated include TEMPO (2,2,6,6-tetramethyl piperidinyl-N-oxyl), and HO-TEMPO (4-hydroxy-2,2,6,6-tetramethylpiperidinyl-N-oxyl).

In addition, component A may be formed by oxidizing the hindered amine compound to obtain N-oxylating compound in the ink composition system.

Preferable examples of the oxidizing agent of the hindered amine compound include peroxide. Component A is generated in the system by the hindered amine compound and the peroxide co-existing in the ink composition. For the oxidation of the hindered amine compound, it is possible to refer to D. J. Carlsson, K. H. Chan and D. M. Wiles, J. Polym. Sci. Polym, Lett. Ed., 19,549 (1981), K. B. Chakraborty and G. Scott, Polymer, 21,252 (1980), Polymer Optical Stabilization Techniques, Osawa Zenjiro, edited by CMC Co., Ltd., p. 112 (2000) and the like.

In addition, from the viewpoint of compatibility with the other components of the ink, the N-oxyl compound is preferably an N-oxyl compound which has an aliphatic cyclic structure.

Furthermore, from the points of view of compatibility with the other components of the ink and of the stability of the ink composition, the N-oxyl compound is preferably an N-oxyl compound which has a hydroxy group.

In the present invention, component A is preferably the compound which is represented by the following Formula (A-1)

[Chem. 2]

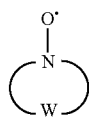

(A-1)

In Formula (A-1), W represents a cyclic alkylene chain which has a carbon number of 4 or 5, and the cyclic alkylene chain may have a substituent.

The compound which is represented by Formula (A-1) is more preferably the compound which is represented by Formula (A-2).

[Chem. 3]

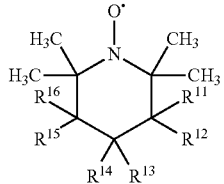

(A-2)

In Formula (A-2), $R^{11}$ to $R^{16}$ each independently represent a hydrogen atom, a halogen atom, or a monovalent organic group, or, $R^{11}$ and $R^{12}$, $R^{13}$ and $R^{14}$, and $R^{15}$ and $R^{16}$ may form one carbonyl group with carbon which is bonded to the above.

In Formula (A-2), in a case where $R^{11}$ to $R^{16}$ are a monovalent organic group, as the monovalent organic group, a hydroxyl group, —$NR^1R^2$ ($R^1$ and $R^2$ each independently represent a hydrogen atom or an alkyl group which has a carbon number of 1 to 12), an alkyl group, an aryl group, an alkoxy group, an aryloxy group, —O(C=O)$R^3$, —NH(C=O)$R^4$ ($R^3$ and $R^4$ each independently represent a hydrogen atom, an alkyl group which has a carbon number of 1 to 12, or an aryl group which has a carbon number of 6 to 20), a carbamoyl group, a carboxy group, a cyano group, a maleimide group, or a phosphoryl group.

The alkyl group is preferably an alkyl group which has a carbon number of 1 to 16 and more preferably an alkyl group which has a carbon number of 1 to 10. In addition, the alkyl group may be straight chain or branched, or may have a cyclic structure.

The aryl group is preferably an aryl group which has a carbon number of 6 to 20 and more preferably an aryl group which has a carbon number of 6 to 10.

The alkoxy group is preferably an alkoxy group which has a carbon number of 1 to 16 and more preferably an alkoxy group which has a carbon number of 1 to 10.

The aryloxy group is preferably an aryloxy group which has a carbon number of 6 to 20 and more preferably an aryloxy group which has a carbon number of 6 to 10.

In addition, in a case where $R^{11}$ to $R^{16}$ are a monovalent organic group, the monovalent organic group may have one or more substituents. In addition, the substituents described above may also be further substituted with other substituents.

Examples of the substituents include halogen atoms such as fluorine atoms, chlorine atoms, bromine atoms, and iodine atoms; alkoxy groups such as a methoxy group, an ethoxy group, and a tert-butoxy group; aryloxy groups such as a phenoxy group, and a p-tolyloxy group; alkoxycarbonyl groups or aryloxycarbonyl groups such as a methoxycarbonyl group, a butoxycarbonyl group, or a phenoxycarbonyl group; aryloxy groups such as an acetoxy group, a propionyloxy group, and a benzoyloxy group; acyl groups such as an acetyl group, a benzoyl group, an isobutyryl group, an acryloyl group, a methacryloyl group, and a methoxallyl group; alkylsulfanyl groups such as a methylsulfanyl group and a tert-butyl sulfanyl group; arylsulfanyl groups such as a phenylsulfanyl group, and a p-tolyl sulfanyl group; alkylamino groups such as a methyl amino group, and a cyclohexylamino group; dialkylamino groups such as a dimethylamino group, a diethylamino group, a morpholino group, and a piperidino group; arylamino groups such as a phenyl amino group and a p-tolylamino group; alkyl groups such as a methyl group, an ethyl group, a tert-butyl group, and a dodecyl group; aryl groups such as a phenyl group, a p-tolyl group, a xylyl group, a cumenyl group, a naphthyl group, an anthryl group, and a phenanthryl group; as well as a hydroxy group, a carboxy group, a formyl group, a mercapto group, a sulfo group, a mesyl group, a p-toluenesulfonyl group, an amino group, a nitro group, a cyano group, a trifluoromethyl group, a trichloromethyl group, a trimethylsilyl group, a phosphono group, a trimethylammonium group, a dimethylsulfonium group, a triphenyl phenacyl phosphonium group, and the like.

In Formula (A-2), $R^{12}$, $R^{15}$ and $R^{16}$ are preferably a hydrogen atom.

In Formula (A-2), $R^{13}$ and $R^{14}$ are a hydrogen atom, a hydroxyl group, —$NR^1R^2$ ($R^1$ and $R^2$ each independently represent a hydrogen atom or an alkyl group which has a carbon number of 1 to 12), an alkyl group (1 to 10 carbon atoms), an aryl group (6 to 10 carbon atoms), an alkoxy group (1 to 10 carbon atoms), an aryloxy group, —$O(C=O)R^3$, —$NH(C=O)R^4$ ($R^3$ and $R^4$ each independently represent a hydrogen atom, an alkyl group which has a carbon number of 1 to 12, or an aryl group which has a carbon number of 6 to 20.), or, $R^{13}$ and $R^{14}$ preferably form one carbonyl group with carbon which is bonded to the above, more preferably, $R^{13}$ is a hydroxy group or an alkoxy group and $R^{14}$ is a hydrogen atom, and particularly preferably, $R^{13}$ is a hydroxy group and $R^{14}$ is a hydrogen atom.

Preferable compounds as component A will be illustrated below; however, the present invention is not limited thereto.

[Chem. 4]

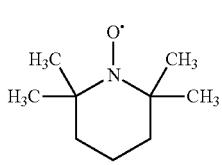
(A-1-1)

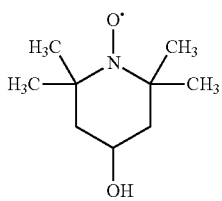
(A-1-2)

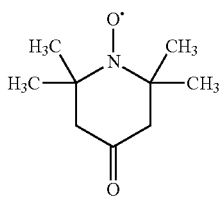
(A-1-3)

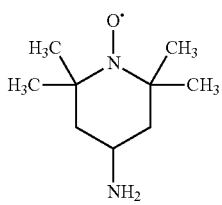
(A-1-4)

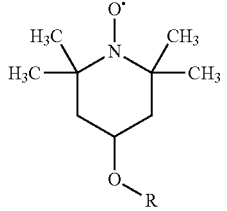
(A-1-5)

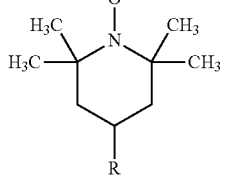
(A-1-6)

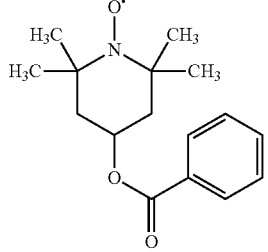
(A-1-7)

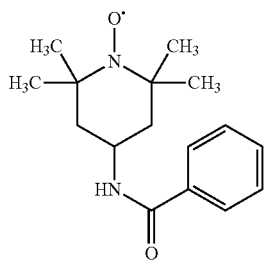
(A-1-8)

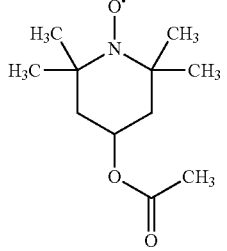
(A-1-9)

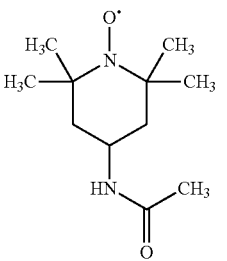
(A-1-10)

Here, R represents a chained alkyl group which has a carbon number of 1 to 10, and the alkyl group may be straight chain or branched.

In the above-described compounds (A-1-1) to (A-1-10), (A-1-1), (A-1-2), (A-1-4), and (A-1-5) are preferable, (A-1-1), (A-1-2), and (A-1-4) are more preferable, and (A-1-2) is particularly preferable.

Component A may be used as one type alone, or may be used by combining two or more types.

With respect to the total amount of the ink composition, the content of component A is preferably 0.05 to 1 mass %, more preferably 0.05 to 0.5 mass %, even more preferably 0.1 to 0.5 mass %, and particularly preferably 0.2 to 0.4 mass %.

(Component B) Polymerizable Compound

The ink composition which is sealed in the ink pack of the present invention preferably contains (component B) a polymerizable compound.

Regarding the polymerizable compounds which are able to be used in the present invention, addition-polymerizable compounds are preferable, and radical polymerizable compounds or cationic polymerizable compounds are more preferable.

In addition, the polymerizable compounds which are able to be used in the present invention may be used as one type alone, or may be used as two or more types, and, for example, may be used by combining radical polymerizable compounds or cationic polymerizable compounds. Among the above, the use of radical polymerizable compounds is particularly preferable.

<Radical Polymerizable Compound>

The radical polymerizable compounds which are able to be used in the present invention are not particularly limited as long as the compounds do not depart from the spirit of the present invention, and it is possible to use well-known radical polymerizable compounds.

As a radical polymerizable compound, for example, photocurable material which uses the photopolymerizable compositions which are described in each of the publications of JP1995-159983A (JP-H07-159983A), JP1995-31399B (JP-H07-31399B), JP1996-224982A (JP-H08-224982A), JP1998-863A (JP-H10-863A), JP1997-80675A (JP-H09-80675A), and the like are known.

The radical polymerizable compound is a compound which has a radical polymerizable ethylenically unsaturated bond, and as long as the compound has at least one radical polymerizable ethylenically unsaturated bond in the molecule, any compound is acceptable, including ones which have chemical forms of monomers, oligomers, polymers, and the like. In order to improve the desired characteristics, the radical polymerizable compound may be included as one type, or may be included as two or more types in an arbitrary ratio.

Preferable examples of the radical polymerizable compound which is able to be used in the present invention include radical polymerizable monomers which have an ethylenically unsaturated double bond group which is selected from a group consisting of a vinyl group, an acrylate group, a methacrylate group, an acrylamide group, a methacrylamide group, and an N-vinyl group.

The ink composition preferably includes at least one of compound which is selected from a group consisting of N-vinyl lactams and (meth)acrylamides, and more preferably includes at least one of compound which is selected from a group consisting of N-vinyl caprolactams and N-isopropyl acrylamides. With the above-described aspect, it is possible to further suppress the dark polymerization, and the character reproducibility of the ink composition is superior.

The ink composition preferably includes N-vinyl lactams. With the above-described aspect, it is possible to further suppress the dark polymerization, and the character reproducibility of the ink composition is superior.

As the N-vinyl lactams, the compound which is represented by Formula (b-1) is preferable.

[Chem. 5]

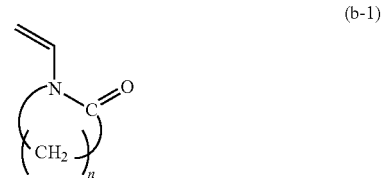

(b-1)

In Formula (b-1), n represents an integer of 2 to 6, and from the points of view of flexibility after the ink composition is cured, adhesion to the recording medium, and availability of raw materials, n is preferably an integer of 3 to 6, n is more preferably 3 or 5, and n is particularly preferably 5, that is, an N-vinyl caprolactam. The N-vinyl caprolactam is excellent in safety, able to be obtained generically at a comparatively low price, and, in particular, able to obtain favorable ink curability and adhesion of the cured film to the recording medium, and is therefore preferable.

In addition, the above-described N-vinyl lactams may have a substituent of an alkyl group, an aryl group, or the like on the lactam ring and may be linked to a saturated or unsaturated cyclic structure.

The N-vinyl lactams may be used alone as one type, or two or more types may be used together.

The ink composition preferably includes (meth)acrylamides, and more preferably includes acrylamides. With the above-described aspect, it is possible to further suppress the dark polymerization, and the character reproducibility of the ink composition is superior.

Examples of the (meth)acrylamides include (meth)acrylamide, N-methyl (meth)acrylamide, N-ethyl (meth)acrylamide, N-propyl (meth)acrylamide, N-isopropyl (meth)acrylamide, N-hexyl (meth)acrylamide, N-cyclohexyl (meth)acrylamide, N-phenyl (meth)acrylamide, N-nitro-phenyl (meth)acryl amide, N-ethyl-N-phenyl (meth)acrylamide, N-(4-hydroxyphenyl) (meth)acrylamide, N-(4-hydroxyphenyl) (meth)acrylamide, N-(4-hydroxyphenyl) (meth)methacrylamide, and the like. Among the above, N-isopropyl acrylamide is particularly preferable.

The (meth)acrylamides may be used alone as one type, or two or more types may be used together.

With respect to the total mass of the ink composition, the total content of the N-vinyl lactams and the (meth)acrylamides in the ink composition is preferably 15 mass % or more, preferably 15 to 50 mass %, more preferably 15 to 40 mass %, and even more preferably 20 to 30 mass % With the above-described aspect, it is possible to further suppress the dark polymerization, and the character reproducibility of the ink composition is superior.

With respect to the total mass of the ink composition, the total content of the N-vinyl caprolactam and the N-isopropyl acrylamide in the ink composition is preferably 15 mass % or more, preferably 15 to 50 mass %, more preferably 15 to 40 mass %, and even more preferably 20 to 30 mass %. With the above-described aspect, it is possible to further suppress the dark polymerization, and the character reproducibility of the ink composition is superior.

The ink composition preferably contains the compound which is represented by the following Formula (b-2).

By containing the compound which is represented by the Formula (b-2), the ink composition has excellent curability and adhesion to the recording medium.

[Chem. 6]

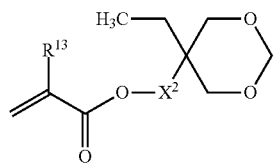

(b-2)

In Formula (b-2), $R^{13}$ represents a hydrogen atom or a methyl group, and $X^2$ represents a single bond or a divalent linking group.

Even when the compound which is represented by the Formula (b-2) is an acrylate compound, the compound may be a methacrylate compound; however, an acrylate compound is preferable, that is, $R^{13}$ is preferably a hydrogen atom.

The divalent linking group in $X^2$ in Formula (b-2) is not particularly limited as long as the effect of the present invention is not greatly impaired; however, a divalent group which combines a divalent hydrocarbon group or a hydrocarbon group and an ether bond is preferable, and a divalent hydrocarbon group, a poly(alkyleneoxy) group, or, a poly(alkyleneoxy)alkyl group is more preferable. In addition, the number of carbon atoms of the divalent linking group is preferably 1 to 60, and more preferably 1 to 20.

As $X^2$ in the Formula (b-2), a single bond, a divalent hydrocarbon group, or a divalent group which combines a hydrocarbon group and an ether bond is preferable, a divalent hydrocarbon group which has a carbon number of 1 to 20 is more preferable, a divalent hydrocarbon group which has a carbon number of 1 to 8 is even more preferable, and a methylene group is particularly preferable.

It is possible to preferably exemplify the compounds (b-2-1) to (b-2-4) which are shown below as specific examples of the compound which is represented by Formula (b-2); however, it is needless to say that the invention is not limited thereto.

[Chem. 7]

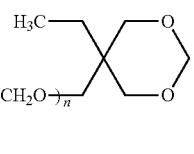

(b-2-1)

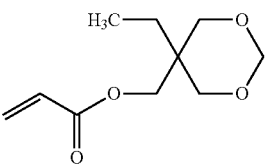

(b-2-2)

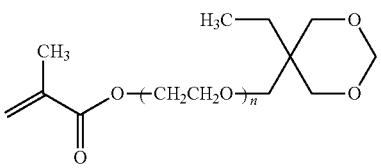

(b-2-3)

n = 1~30

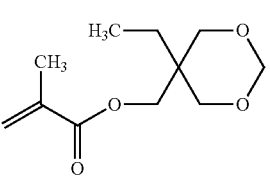

(b-2-4)

n = 1~30

Among the above, cyclic trimethylolpropane formal acrylate (b-2-1) and cyclic trimethylolpropane formal methacrylate (b-2-2) are preferable, and cyclic trimethylolpropane formal acrylate (b-2-1) is particularly preferable.

With respect to the total mass of the ink composition, the content of the compound which is represented by the Formula (b-2) in the ink composition is preferably 3 to 70 mass %, more preferably 20 to 70 mass %, even more preferably 30 to 70 mass %, and particularly preferably 40 to 60 mass %. Within the above-described ranges, the curability and adhesion to the recording medium are excellent.

The ink composition preferably contains an oligomer.

This "oligomer" is generally a polymer which has structural units based on a finite number (typically 5 to 100) of monomers. The weight average molecular weight of the oligomer is preferably 400 to 10,000, and more preferably 500 to 5,000.

As the oligomers, ones which have a polymerizable group as a functional group are preferable, ones which have an ethylenically unsaturated group are more preferable, and ones which have a (meth)acryloyl group are particularly preferable.

From the viewpoint of the balance of flexibility and curability, the number of functional groups which are included in the oligomer is preferably 1 to 15 per molecule, more preferably 2 to 6, even more preferably 2 to 4, and particularly preferably 2.

Examples of the oligomers in the present invention include polyester (meth)acrylate-based, olefin-based (ethylene oligomers, propylene oligomers, butene oligomers, or the like), vinyl-based (styrene oligomers, vinyl alcohol oligomers, vinyl pyrrolidone oligomers, (meth)acrylate oligomers, and the like), diene-based (butadiene oligomers, chloroprene rubber, pentadiene oligomers, or the like), ring-opening polymerization-based (di, tri, tetraethylene glycol, polyethylene glycol, polyethylimine, and the like), polyaddition-based (oligo ester (meth)acrylate, polyamide oligomers, and polyisocyanate oligomers), addition condensate oligomers (phenolic resins, amino resins, xylene resins, ketone resins, and the like), amine-modified polyester oligomers, and the like. Among the above, urethane (meth)acrylate and polyester (meth)acrylate are more preferable, and urethane (meth)acrylate is particularly preferable since it is possible to obtain an ink composition with excellent curability and adhesion. In addition to being used alone, a plurality of types of oligomers may be used together.

Examples of the urethane (meth)acrylate include aliphatic urethane (meth)acrylate, aromatic urethane (meth)acrylate, and the like. For more details, it is possible to refer to The Oligomer Handbook (edited by Junji Furukawa, The Chemical Daily Co., Ltd.).

Examples of the urethane (meth)acrylate include U-2PPA, U-4HA, U-6HA, U-6LPA, U-15HA, U-324A, UA-122P, UA5201, UA-512, and the like which are manufactured by Shin-Nakamura Chemical Industry Co., Ltd.; CN964A85, CN964, CN959, CN962, CN963J85, CN965, CN982B88, CN981, CN983, CN996, CN9002, CN9007, CN9009, CN9010, CN9011, CN9178, CN9788, and CN9893 manufactured by Sartomer Japan Co., Ltd.; and EB204, EB230, EB244, EB245, EB270, EB284, EB285, EB810, EB4830, EB4835, EB4858, EB1290, EB210, EB215, EB4827, EB4830, EB4849, EB6700, EB204, EB8402, EB8804, EB8800-20R, and the like which are manufactured by Daicel-Cytec Co., Ltd.

Examples of amine-modified polyester oligomers include EB524, EB80, and EB81 which are manufactured by Daicel-Cytec Co., Ltd.; CN550, CN501, CN551 which are manufactured by Sartomer Japan Co., Ltd.; and GENOMER5275 which is manufactured by Rahn A. G.

From the viewpoint of achieving both the curability and the adhesion, the content of the oligomers is preferably 1 to 10 mass %, more preferably 2 to 8 mass %, and even more preferably 3 to 7 mass % with respect to the total mass of the ink composition.

Examples of monofunctional (meth)acrylates other than the above include 2-phenoxyethyl (meth)acrylate, benzyl (meth)acrylate, isoamyl (meth)acrylate, stearyl (meth)acrylate, lauryl (meth)acrylate, octyl (meth)acrylate, isooctyl (meth)acrylate, decyl (meth)acrylate, isoamyl still (meth) acrylate, isostearyl (meth)acrylate, 2-ethylhexyl diglycol (meth)acrylate, 2-methoxyethyl (meth)acrylate, butoxyethyl (meth)acrylate, methoxy diethylene glycol (meth)acrylate, methoxy polyethylene glycol (meth)acrylate, methoxy propylene glycol (meth)acrylate, tetrahydrofurfuryl (meth)acrylate, isobornyl (meth)acrylate, 2-(meth)acryloxyethyl succinic acid, 2-(meth)acryloxyethyl-2-hydroxyethyl phthalate, lactone-modified saccharide (meth)acrylate, t-butyl cyclohexyl (meth)acrylate, 2-(2-ethoxyethoxy) ethyl (meth)acrylate, cyclopentenyl (meth)acrylate, cyclopentenyloxy ethyl (meth)acrylate, dicyclopentanyl (meth)acrylate, and the like.

The ink composition which is able to be used in the present invention preferably includes a multifunctional polymerizable compound, and more preferably includes a multifunctional (meth)acrylate compound. By containing a multifunctional polymerizable compound, it is possible to obtain high curability.

Examples of the multifunctional (meth)acrylate compound include trimethylolpropane tri(meth)acrylate, ethoxylated (3) trimethylolpropane tri(meth)acrylate (compound where a trimethylolpropane ethylene oxide 3 mol adduct is tri(meth)acrylated), propoxylated (3) trimethylolpropane tri(meth)acrylate (compound where a trimethylolpropane propylene oxide 3 mol adduct is tri(meth)acrylated), bis(4-acryloxypolyethoxy phenyl) propane, neopentyl glycol di(meth)acrylate, ethoxylated (2) neopentyl glycol di(meth)acrylate (compound where a neopentyl glycol ethylene oxide 2 mol adduct was diacrylated), propoxylated (2) neopentyl glycol di(meth)acrylate (compound where neopentyl glycol propylene oxide 2 mol adduct was diacrylated), 1,6-hexanediol di(meth)acrylate, 1,9-nonanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, tetrapropylene glycol di(meth)acrylate, polypropylene glycol di(meth)acrylate, pentaerythritol tri(meth)acrylate, pentaerythritol tetra(meth)acrylate, di pentaerythritol tetra (meth)acrylate, tetramethylolmethane tetra(meth)acrylate, tetramethylolmethane tri(meth)acrylate, dimethyloltricyclodecane di(meth)acrylate, modified glycerine tri(meth)acrylate, modified bisphenol A di(meth)acrylate, propylene oxide (PO) of bisphenol A adduct di(meth)acrylate, ethylene oxide (EO) of bisphenol A adduct di(meth)acrylate, dipentaerythritol hexa(meth)acrylate, caprolactone-modified dipentaerythritol hexa(meth)acrylate, and the like.

Among the above, trimethylolpropane tri(meth)acrylate, ethoxylated (3) trimethylolpropane tri(meth)acrylate, and propoxylated (2) neopentyl glycol di(meth)acrylate are particularly preferable.

The multifunctional polymerizable compounds may be used alone as one type, or two or more types may be used together.

The ink composition preferably includes both a multifunctional (meth)acrylate compound and an alkoxylated multifunctional (meth)acrylate compound which corresponds to the multifunctional (meth)acrylate compound, more preferably includes both trimethylolpropane (meth)acrylate and an alkoxylated trimethylolpropane tri(meth)acrylate compound, and particularly preferably includes trimethylolpropane tri (meth)acrylate, ethoxylated (3) trimethylolpropane tri(meth) acrylate and propoxylated (2) neopentyl glycol di(meth)acrylate. With the above-described aspect, the curability is superior.

In addition, the ink composition preferably includes both of a difunctional (meth)acrylate compound, and a difunctional (meth)acrylate compound. With the above-described aspect, the curability is superior.

From the viewpoint of the curability, the total content of the multifunctional polymerizable compound is preferably 1 to 30 mass % with respect to the total mass of the ink composition, more preferably 3 to 25 mass %, even more preferably 5 to 20 mass %, and particularly preferably 10 to 18 mass %.

The total content of the (component B) the polymerizable compound in the ink composition is preferably 65 to 99 mass % and more preferably 70 to 90 mass %.

(Component C) Photopolymerization Initiator

The ink composition which is sealed in the ink pack of the present invention preferably contains (component C) a photopolymerization initiator.

Examples of the photopolymerization initiator include a radical photopolymerization initiator and a cationic photopolymerization initiator; however, the ink composition more preferably contains a radical photopolymerization initiator.

It is possible to use well-known photopolymerization initiators as the photopolymerization initiator. The photopolymerization initiators which are able to be used in the present invention may be used alone, or may be used together as two or more types. In addition, the radical photopolymerization initiator and the cationic photopolymerization initiator may be used together.

The photopolymerization initiators which are able to be used in the present invention are compounds which absorb ultraviolet rays or which generate a polymerization initiating species by the action of a sensitizer which absorbs the ultraviolet rays.

Examples of the photopolymerization initiators which are able to be used in the present invention include (a) aromatic ketones, (b) acyl phosphine compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds which have a carbon-halogen bond, (m) alkylamine compounds, and the like. These polymerization initiators may use the above-described compounds (a) to (m) alone or in combination. The details of the above-described polymerization initiators are well known to persons skilled in the art and are described in JP2009-185186A for example.

The photopolymerization initiator in the present invention may be suitably used alone as one type or in a combination of two or more types; however, a combination of two or more types is preferable, a combination of three or more types is more preferable, and a combination of three to five types is even more preferable.

The photopolymerization initiator preferably includes an acyl phosphine-based polymerization initiator. Even in a case where an acyl phosphine-based polymerization initiator where dark polymerization proceeds easily is used, it is possible for the ink pack of the present invention to suppress the dark polymerization, and the character reproducibility of the ink composition is superior.

Preferable examples of the acyl phosphine-based polymerization initiator include a bisacyl phosphine compound, and a monoacyl phosphine compound.

The ink composition more preferably includes at least monoacyl phosphine compound.

Preferably examples of the bisacyl phosphine compound and the monoacyl phosphine compound include the bisacyl phosphine oxide compounds and the monoacyl phosphine compounds which are described in paragraphs 0080 to 0098 of JP2009-096985A.

Among the above, bis(2,4,6-trimethyl benzoyl)phenyl phosphine oxide is preferable as the bisacyl phosphine oxide compound.

In addition, 2,4,6-trimethyl benzoyl diphenyl phosphine oxide is preferable as the monoacyl phosphine oxide compound.

In addition, preferable examples of the photopolymerization initiator include aromatic ketones, more preferably α-hydroxy ketone compounds, α-amino ketone compounds, and even more preferably α-hydroxy ketone compounds.

Examples of the α-hydroxy ketone compounds include 1-[4-(2-hydroxyethoxy)-phenyl]-2-hydroxy-2-methyl-1-propan-1-one, 2-hydroxy-2-methyl-1-phenylpropan-1-one, and 1-hydroxy cyclohexyl phenyl ketone, and the like.

Examples of the α-amino ketone compounds include 2-methyl-1-phenyl-2-morpholinopropan-1-one, 2-methyl-1-[4-(hexyl)phenyl]-2-morpholinopropan-1-one, 2-ethyl-2-dimethylamino-1-(4-morpholinophenyl)-butan-1-one, and the like.

Here, the photopolymerization initiator in the present invention includes not only a compound which generates a polymerization initiating species by absorbing ultraviolet rays but also a compound (commonly called a sensitizer) which promotes the decomposition of the polymerization initiator by absorbing ultraviolet rays.

It is possible for the ink composition to use a well-known sensitizer as the photopolymerization initiator.

The sensitizer in the present invention is a compound which promotes the decomposition of the photopolymerization initiator by absorbing ultraviolet rays, and the curability is superior due to the sensitizer being contained.

Examples of the sensitizer include polynuclear aromatics (for example, pyrene, perylene, triphenylene, 2-ethyl-9,10-dimethoxy-anthracene, or the like), xanthenes (for example, fluorescein, eosin, erythrosine, rhodamine B, rose bengal, or the like), cyanines (for example, thiacarbocyanine, oxacarbocyanine, or the like), merocyanines (for example, merocyanine, carbo merocyanine or the like), thiazines (for example, thionine, methylene blue, toluidine blue, or the like), acridines (for example, acridine orange, chloro flavin, acriflavine and the like), anthraquinones (for example, anthraquinone, or the like), squaryliums (for example, squarylium or the like), coumarins (for example, 7-diethylamino-4-methyl coumarin, or the like), thioxanthones (for example, 2,4-diethylthioxanthone, 2-isopropylthioxanthone, and 4-isopropylthioxanthone, or the like), thiochromanones (for example, thiochromanone or the like), and the like.

Among the above, thioxanthones are preferable, and 2-isopropylthioxanthone and/or 4-isopropylthioxanthone are more preferable.

In addition, the sensitizer may be used alone or two or more types may be used in combination.

The content of the photopolymerization initiator in the ink composition is preferably 0.1 to 20.0 mass % with respect to the total mass of the ink composition, more preferably 0.5 to 18.0 mass %, and even more preferably 1.0 to 15.0 mass %. Within the above-described ranges, the curability is excellent and, in addition, it is appropriate from the viewpoint of reducing surface tackiness.

(Component D) Other Polymerization Inhibitor

The ink composition which is sealed in the ink pack of the present invention may contain (Component D) another photopolymerization initiator other than component A.

Examples of the other polymerization inhibitors include nitroso-based polymerization inhibitors, phosphoric acid ester-based polymerization inhibitors, hydroquinone, methoxy hydroquinone, benzoquinone, p-methoxyphenol, hindered amines, and the like.

Specific examples of the nitroso-based polymerization inhibitors which are preferably used in the present invention are given below; however, the present invention is not limited thereto.

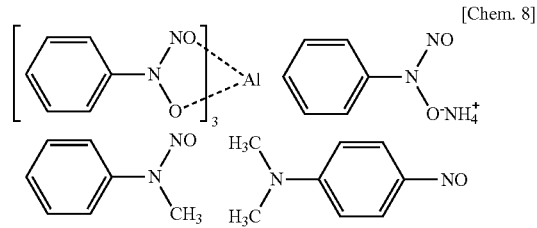

[Chem. 8]

Examples of commercially available nitroso-based polymerization inhibitors include FIRSTCURE ST-1 (manufactured by Chem First Ltd)

Examples of phosphoric acid ester-based polymerization inhibitors include triphenyl phosphite, tris (nonyl phenyl phosphite), triethyl phosphite, tris (2-ethylhexyl)phosphite, tridecyl phosphite, tris (tridecyl)phosphite, diphenyl mono (2-ethylhexyl)phosphite, diphenyl mono decyl phosphite, diphenyl mono (tridecyl)phosphite, dilauryl hydrogen phosphite, tetraphenyl dipropylene glycol diphosphite, tetraphenyl tetra (tridecyl)pentaerythritol tetra phosphite, tetra (tridecyl)-4,4'-isopropylidene diphenyl diphosphite, trilauryl trithiophosphite, bis (tridecyl)pentaerythritol diphosphite, tristearyl phosphite, distearyl pentaerythritol diphosphite, bis (nonylphenyl)pentaerythritol diphosphite, tris (2,4-di-t-butylphenyl)phosphite, and the like.

Among the above, cupferron Al (tris (N-nitroso-N-phenylhydroxylamine)aluminum salt, FIRSTCURE ST-1) and/or methoxy hydroquinone are preferable.

The content of the other polymerization inhibitor in the ink composition which is able to used in the present invention is preferably 0.5 mass % or less, more preferably 0.01 to 0.5 mass %, and even more preferably 0.05 to 0.2 mass %. When in the above-described numerical ranges, it is possible to suppress the polymerization during storage when preparing the ink composition and it is possible to prevent clogging of inkjet nozzles.

(Component E) Coloring Agent

In a case where the ink composition is a colored ink composition, the ink composition preferably contains a coloring agent. Among these, as the coloring agent, it is more preferable to contain a phthalocyanine pigment, particularly preferably copper phthalocyanine. With the above-described aspect, it is possible to further exhibit the effects of the present invention.

The coloring agent which is used in the present invention is not particularly limited; however, pigments with rich color reproduction and pigments which are oil-soluble, which have excellent weather resistance, are preferable, and it is possible to use a well-known coloring agent which is arbitrarily selected from soluble pigments or the like. As a coloring agent which is able to be preferably used in the present invention, it is preferable to select a compound which does not function as a polymerization initiator in the polymerization reaction which is the curing reaction from the viewpoint of not decreasing the sensitivity of the curing reaction due to active rays.

The pigments which can be used in the present invention are not particularly limited; however, for example, it is possible to use the following numbered organic or inorganic pigments as described in the color index.

As red or magenta pigments, it is possible to use Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, 88, Pigment Orange 13, 16, 20, 36, as blue or cyan pigments, Pigment Blue 1, 15, 15:1, 15:2, 15:3, 15:4, 15:6, 16, 17-1, 22, 27, 28, 29, 36, 60, as a green pigment, Pigment Green 7, 26, 36, 50, as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, 193, as a black pigment, Pigment Black 7, 28, 26, and as a white pigment, Pigment White 6, 18, 21, and the like according to the desired purpose.

Among the above, preferable examples include phthalocyanine pigments such as C. I. Pigment Blue 15, 15:1, 15:2, 15:3, 15:4, 15:6, 16, 17:1, and the like.

Below, description will be given of oil-soluble dyes which are able to be used in the present invention.

The oil-soluble dyes which are able to be used in the present invention refer to dyes which are substantially insoluble in water. Specifically, this means that the degree of solubility in water at 25° C. (the mass of dye which is able to be dissolved in 100 g of water) is 1 g or less, preferably 0.5 g or less, and even more preferably 0.1 g or less. Accordingly, the oil-soluble dye refers to a so-called water-insoluble pigment or an oil-soluble dye, and of these, the oil-soluble dye is preferable.

Among the oil-soluble dyes which are able to be used in the present invention, it is possible to use an arbitrary dye as a yellow dye. Examples include aryl or heteryl azo dyes which have phenols, naphthols, anilines, pyrazolones, pyridones, or an open-chain active methylene compound as coupling components; azo methine dyes which have an open-chain active methylene compound as a coupling component for example; methine dyes such as benzylidene dyes or monomethine oxonol dyes for example; quinone-based dyes such as naphthoquinone dyes, anthraquinone dyes, and the like for example; and the like, and examples of other types of dyes include quinophthalone dyes, nitro-nitroso dyes, acridine dyes, acridinone dyes, and the like.

Among the oil-soluble dyes which are able to be used in the present invention, it is possible to use an arbitrary dye as a magenta dye. Examples include aryl or heteryl azo dyes which have phenols, naphthols, or anilines as coupling components for example; azomethine dyes which have pyrazolones, or pyrazolotriazoles as coupling components for example; methine dyes such as arylidene dye, styryl dye, merocyanine dye, and oxonol dye for example; carbonium dyes such as diphenylmethane dye, triphenylmethane dye, and xanthene dye; for example quinone-based dyes such as naphthoquinone, anthraquinone, and anthrapyridone; condensed polycyclic dyes such as dioxazine dyes for example; and the like.

Among the oil-soluble dyes which are able to be applied to the present invention, it is possible to use an arbitrary dye as a cyan dye. Examples include indoaniline dyes, indophenol dyes, or azomethine dyes which have pyrrolotriazoles as coupling components; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes which have phenols, naphthols, or aniline as coupling components for example; indigo and thioindigo dyes; and the like.

Each of the dyes may be one which exhibits each color of yellow, magenta, and cyan where a part of the chromophore (chromogenic atomic group) is initially dissociated; may be one where a counter cation in such a case is an inorganic cation such as an alkali metal or ammonium; may be one which has an organic cation such as pyridinium, or quaternary ammonium salts; or may also be one which has a polymer cation which has the above as a partial structure.

Without being limited to the following, preferable specific examples include C. I. Solvent Black 3, 7, 27, 29 and 34; C. I. Solvent Yellow 14, 16, 19, 29, 30, 56, 82, 93 and 162; C. I. Solvent Red 1, 3, 8, 18, 24, 27, 43, 49, 51, 72, 73, 109, 122, 132 and 218; C. I. Solvent Violet 3; C. I. Solvent Blue 2, 11, 25, 35, 38, 67 and 70; C. I. Solvent Green 3 and 7; C. I. Solvent Orange 2; and the like.

Particularly preferable examples among the above include Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (manufactured by Orient Chemical Co., Ltd.), Aizen Spilon Blue GNH (manufactured by Hodogaya Chemical Co., Ltd.), NeopenYellow 075, Neopen Mazenta SE1378, Neopen Blue 808, Neopen Blue FF4012, Neopen Cyan FF4238 (manufactured by BASF Co., Ltd.), and the like.

In the present invention, the oil-soluble dye may be used alone as one type or in combination of several types.

In addition, when using an oil-soluble dye as the coloring agent, it is possible to combine coloring agents such as other water-soluble dyes, disperse dyes, and pigments according to necessity in a range which does not inhibit the effects of the present invention.

In the present invention, it is also possible to use a disperse dye in a range where the dye dissolves in a water-immiscible organic solvent. The disperse dye encompasses typical water-soluble dyes and is preferably used in a range where the dye dissolves in a water-immiscible organic solvent in the present invention. Specific examples of preferable disperse dyes include C. I. Disperse Yellow 5, 42, 54, 64, 79, 82, 83, 93, 99, 100, 119, 122, 124, 126, 160, 184:1, 186, 198, 199, 201, 204, 224, 237; C. I. Disperse Orange 13, 29, 31:1, 33, 49, 54, 55, 66, 73, 118, 119 and 163; C. I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, 362; C. I. Disperse Violet 33; C. I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; C. I. Disperse Green 6:1 and 9; and the like.

The coloring agents which are able to be used in the present invention are preferably appropriately dispersed in the ink composition after being added to the ink composition. For the dispersion of the coloring agent, it is possible to use various dispersion apparatuses such as a bead mill, a ball mill, a sand mill, an attritor, a roll mill, an agitator, a Henschel mixer, a colloid mill, an ultrasonic homogenizer, a pearl mill, a wet jet mill, and a paint shaker.

The coloring agent may be blended by being directly added along with each component when preparing the ink composition; however, in order to improve dispersibility, it is possible to perform blending after adding in advance to the solvent or the dispersion medium such as the radical polymerizable compound which is used in the present invention and carrying out uniform dispersion or dissolution.

In the present invention, in order to avoid the problems of deterioration of the solvent resistance in a case where the solvent remains in the cured image and of VOC (Volatile Organic Compounds) of the remaining solvent, the coloring agent is preferably added and blended in advance in a dispersion medium such as a radical polymerizable compound. Here, in a case where only the viewpoint of the dispersion suitability is considered, a low viscosity monomer is preferably selected as the polymerizable compound which is used in the adding of the coloring agent.

The coloring agents may be appropriately selected and used as one type or two or more types according to the purpose for which the ink composition is to be used.

Here, when a coloring agent such as a pigment which is present as a solid in the ink composition is used, the selection of the coloring agent, the dispersing agent, and the dispersion medium, and the dispersion conditions and filter conditions are preferably set such that the average particle diameter of the coloring agent particles is preferably 0.005 to 0.5 more preferably 0.01 to 0.45 μm, and even more preferably 0.015 to 0.4 μm. The particle diameter management is preferable since the clogging of head nozzles is suppressed, and it is possible to maintain the storage stability of the ink, the ink transparency, and the curing sensitivity.

In the present invention, the content of the coloring agent in the ink composition is appropriately selected according to the color and intended purpose; however, the content is preferably 0.01 to 30 mass % with respect to the total mass of the ink composition.

(Component F) Dispersing Agent

The ink composition preferably contains (component F) a dispersing agent. In particular, in a case where the ink composition is used as a color ink composition, the (component F) dispersing agent is preferably contained with an object of improving the dispersibility of the coloring agent, in particular, of the pigment.

The dispersing agent is preferably a polymer dispersing agent. Here, "polymer dispersing agent" in the present invention means a dispersing agent where the weight average molecular weight is 1,000 or more.

Examples of the polymer dispersing agent include DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie Co., Ltd.); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, EFKA7580 (manufactured by EFKA Additives Co., Ltd.); Disperse Aid 6, Disperse Aid 8, Disperse Aid 15, Disperse Aid 9100 (manufactured by San Nopco Co., Ltd.); various Solsperse dispersing agents such as Solsperse (Solsperse) 3000, 5000, 9000, 12000, 13240, 13940, 17000, 22000, 24000, 26000, 28000, 32000, 36000, 39000, 41000, 71000 (manufactured by Noveon, Inc.); Adeka Pluronic L31, F38, L42, L44, L61, L64, F68, L72, P95, F77, P84, F87, P94, L101, P103, F108, L121, P-123 (manufactured by Adeka Ltd.), Ionetto S-20 (Sanyo Chemical Industries, Ltd.); Disparlon KS-860, 873SN, 874 (polymer dispersing agent), #2150 (aliphatic polycarboxylic acid), #7004 (polyether ester type) (Kusumoto Kasei Co., Ltd.), and the like.

The content of the dispersing agent in the ink composition is appropriately selected according to the purpose of use; however, the content is preferably 0.05 to 15 mass % with respect to the total mass of the ink composition.

(Component G) Surfactant

In order to provide a long-term stable ejection property, a surfactant may be added to the ink composition.

However, from the viewpoint of suppressing glossiness and stripe unevenness, the ink composition preferably either does not contain a silicone-based surfactant or a fluorine-based surfactant, or has a silicone-based surfactant or a fluorine-based surfactant with total content of more than 0 mass % to 0.03 mass % or less with respect to the total mass of the ink composition, more preferably more than 0 mass % to 0.005 mass % or less.

Here, examples of surfactants other than the silicone-based surfactants and fluorine-based surfactants include those which are described in each of JP1987-173463A (JP-562-173463A) and JP1987-183457A (JP-562-183457A). Examples include anionic surfactants such as dialkyl sulfosuccinate salts, alkyl naphthalene sulfonic acid salts, and fatty acid salts; non-ionic surfactants such as polyoxyethylene alkyl ethers, polyoxyethylene alkyl allyl ethers, acetylene glycols, and polyoxyethylene-polyoxypropylene block copolymers; and cationic surfactants such as alkyl amine salts, and quaternary ammonium salts.

<Other Components>

In addition to each of the components, the ink composition of the present invention may include, as necessary, a co-sensitizer, an ultraviolet absorber, an antioxidant, an anti-fading agent, a conductive salts, a solvent, a polymer compound, a basic compound, a leveling additive, a matting agent, a polyester resin for adjusting physical properties, a polyurethane-based resin, a vinyl-based resin, an acrylic-based resin, a rubber-based resin, waxes, or the like. It is possible to use well-known components as these other components and examples thereof include those which are described in JP2009-221416A.

<Ink Properties>

In consideration of the ejection property, the ink composition which is able to be used in the present invention preferably has a viscosity at 25° C. of 40 mPa·s or less, more preferably 5 to 40 mPa·s, and even more preferably 7 to 30 mPa·s. In addition, the viscosity at the ejection temperature (preferably 25 to 80° C. and more preferably 25 to 50° C.) is preferably 3 to 15 mPa·s, more preferably 3 to 13 mPa·s. The component ratio of the ink composition is preferably appropriately adjusted such that the viscosity is within the above-described ranges. By setting the viscosity to be high at room temperature (25° C.), it is possible to avoid penetration of the ink into the target recording medium and to reduce the uncured monomers even in a case of using a porous target recording medium, which is preferable. Furthermore, it is possible to suppress bleeding of ink during the landing of the ink droplets and the image quality is improved as a result, which is preferable.

In the present invention, the viscosity of the ink composition is preferably measured using a B type viscometer: Brookfield LVDV-I (Brookfield Corp.) under conditions of 25° C. and a number of rotations of the rotor of 20 rpm.

The surface tension of the ink composition which is able to be used in the present invention at 25° C. is preferably 40 mN/m or less from the viewpoint of wettability, more preferably 35 mN/m or less, and even more preferably 30 mN/m or less. In addition, from the viewpoint of bleeding and penetration, the surface tension is preferably 20 mN/m or more, and more preferably 23 mN/m or more.

Here, it is possible to use a well-known method as the method of measuring the surface tension of the ink composition at 25° C.; however, measurement using a wheel suspension method or the Wilhelmy method is preferable. In the present invention, the surface tension is preferably measured using a typically used surface tension meter (for example, the surface tension meter CBVP-Z or the like, manufactured by Kyowa Interface Science Co., Ltd.) with a liquid temperature of 25° C. using the Wilhelmy method.

<Configuration of Ink Pack>

The ink pack of the present invention is an ink pack where the ink composition is sealed in a pack where at least one layer of an aluminum layer or an aluminum alloy layer and at least one layer of a plastic layer are laminated.

As the ink pack of the present invention, it is possible to exemplify a configuration which has a plastic case or a bag, preferably a configuration which has a bag.

The ink pack of the present invention is preferably configured from an ink bag in which the ink composition is stored and an ink supply hole section (a cylindrical member) which is provided in the ink bag. The ink bag has a bag shape which has flexibility and has an inner section layer formed of material where the main component is substantially the same material as the cylindrical member at the inner peripheral surface thereof, and the outer peripheral surface of the cylindrical member is preferably welded to the inner surface layer. In addition, the cylindrical member and the ink bag are preferably coupled to have a strong welding force.

The ink bag is not particularly limited; however, for example, it is possible to favorably use one where, centering on an aluminum layer or an aluminum alloy layer, an adhesive layer and a nylon layer (the outer layer) are laminated in order on one surface side, and an adhesive layer, a polyethylene terephthalate layer, an adhesive layer, and a polypropylene layer or a polyethylene layer (the inner layer) are laminated in order on the other surface side.

In addition, for the ink pack of the present invention, the material of the surface which directly contacts the ink composition of the ink pack is preferably plastic, more preferably polypropylene or polyethylene. With the above-described aspect, it is possible to further suppress the dark polymerization and the character reproducibility of the ink composition is superior.

In addition, the ink pack of the present invention is preferably a light-shielding ink pack where the aluminum layer and/or aluminum alloy layer functions as a light-shielding layer and which has a mechanical strength which prevents pin holes. With the above-described aspect, the effects of the present invention are further exhibited.

The ink pack of the present invention is a pack where at least one layer of an aluminum layer or an aluminum alloy layer are laminated. The ink pack of the present invention is preferably an oxygen impermeable ink pack.

The aluminum alloy which is the material of the aluminum alloy layer is not particularly limited and it is possible to use a well-known aluminum alloy which includes arbitrary chemical elements. For example, it is possible to exemplify alloys with one or more types of chemical elements which are selected from a group consisting of aluminum, silver, gold, platinum, nickel, chromium tin, zinc, indium, titanium, and copper.

The thickness of the aluminum layer or the aluminum alloy layer is not particularly limited; however, 10 nm to 200 μm is preferable, 100 nm to 150 μm is more preferable, and 1 to 100 μm is even more preferable.

In addition, the aluminum layer or the aluminum alloy layer in the ink pack of the present invention is preferably not directly in contact with the ink composition.

Furthermore, the ink pack of the present invention preferably has at least one plastic layer on both sides of the at least one layer of an aluminum layer or an aluminum alloy layer respectively.

The aluminum or aluminum alloy layer may be manufactured by a well-known method, for example, a vapor deposition method or a laminating method.

The ink pack of the present invention is a pack where at least one plastic layer is laminated.

The material of the plastic layer is not particularly limited as long as the material is a plastic; however, preferable examples include polyamide, polyurethane, polyvinyl chloride, polycarbonate, polystyrene, polytetrafluoroethylene, polybutadiene, polyolefin, poly-4-methylpentene, ionomer, polysulfone, cellulose triacetate, ethyl cellulose, butyl acetate cellulose, polydimethylsiloxane, polyester ethylene-vinyl acetate copolymers, fluorinated polyolefins, polychloroprene, butyl rubber, acrylonitrile-butadiene-styrene copolymers (ABS resin), butadiene-acrylonitrile copolymers, and butadiene styrene copolymers.

Among the above, from the points of view of chemical resistance, strength, heat weldability, cost, and the like, polyamide (preferably, nylon), polyvinyl chloride, polycarbonate, polystyrene, polybutadiene, polyolefins (preferably, polyethylene, or polypropylene), poly-4-methylpentene, ionomer, ABS resin, polysulfone, or cellulose triacetate are more preferable, and polyethylene, polypropylene, polybutadiene, or poly-4-methylpentene are even more preferable.

Here, in a case where the ink pack of the present invention has two or more plastic layers, the plastic layers may be the same as each other or may be different, without being particularly limited.

From the points of view of obtaining sufficient oxygen permeability and strength, the plastic layer preferably has a film thickness per layer of 5 to 200 more preferably 10 to 175 μm, even more preferably 20 to 150 μm, and particularly preferably 25 to 75 μm.

The plastic layer may be manufactured by a known method, with examples including a melt extrusion forming method, a solution casting method, a calender roll method, and the like. In addition, applying a stretching process is also preferable, in particular, the polypropylene film is preferably a polypropylene film to which a stretching process has been applied.

In addition, the ink pack of the present invention may have at least one adhesive layer in order to adhere the aluminum layer or aluminum alloy layer to the plastic layer; or the aluminum layers or aluminum alloy layers to the plastic layers.

The material of the adhesive layer is not particularly limited as long as bonding is possible, and it is possible to use a well-known adhesive or adhesive resin. In the layer configuration of the sheets which are used in the ink pack of the present invention, the ink contact surface (the inner side) is a polyolefin layer which has a film thickness of 50 to 200 microns, and it is preferable that an aluminum layer with a film thickness of 5 to 20 microns or a plastic layer with a film thickness of 10 to 30 microns (the outer side) be laminated thereon. It is more preferable to use a layer configuration where the ink contact surface (the inner side) is a polyethylene or polypropylene layer with a film thickness of 50 to 200 microns and an aluminum layer with a film thickness of 5 to 20 microns or a plastic layer with a film thickness of 10 to 30 microns (the outer side) is laminated thereon.

In addition, detailed description will be given of the ink pack of the present invention with reference to the drawings.

FIG. 1 is an exploded perspective view which shows a preferable example of the ink pack of the present invention and an example of an ink cartridge where the ink pack is stored.

An ink cartridge 130 stores an ink pack 133 with a bag shape in a space which is surrounded by a case main body 132 and a case cover 131 which are made of plastic. The ink pack 133 is configured by attaching a supply unit 134 which is a cylindrical member to one end of the bag which is formed in a bag shape by the film, and the ink composition which is a radical polymerizable composition is stored in the inner section of the ink pack 133.

The distal end section of the supply unit 134 is exposed to the outside of the case from a cut-out portion 140 which is provided in the front surface wall of the case main body 132 such that, in a state where the ink cartridge 130 is mounted in a cartridge holder (which is not shown in the diagram), the supply of ink to a printer main body is performed through the supply unit 134. Here, in a state where the ink cartridge 130 is not mounted, it is preferable that the opening of the supply unit 134 be closed by a valve which is provided in the inner section.

The ink pack 133 is formed in a flat shape which is interposed by a top surface 137 and a bottom surface 138 and one end side to which the supply unit 134 is attached and another end side with regard to the one end side are heat welded to respectively form a front end welded section 135 and a rear end welded section 136. In addition, the side surfaces between the top surface 137 and the bottom surface 138 are also heat welded and a side surface welding section 139 is formed.

In FIG. 1, the ink pack 133 is processed into a bag shape by heat welding (heat sealing) the top surface 137 and the bottom surface 138. For example, the ink pack 133 of the present example is formed into a bag shape by first bonding the three sides of the end side where the supply unit 134 is attached and the two sides which are orthogonal thereto using heat welding. Then, the ink is introduced into the ink pack 133 using the opening in the one remaining side in the ink pack 133 which is formed into a bag shape in the above manner and finally, the one remaining side is bonded using heat welding to create a state where the ink is sealed inside the ink pack 133.

(Inkjet Recording Method)

It is possible to suitably use the ink pack of the present invention in an inkjet recording method.

The inkjet recording method of the present invention is preferably a method which forms an image by ejecting the ink composition which is stored in the ink pack of the present invention onto a recording medium (a support body, recording material, or the like), irradiating the ink composition which was ejected onto the recording medium with ultraviolet rays, and curing the ink composition.

More specifically, the inkjet recording method of the present invention includes ($a^1$) a step of ejecting the ink composition which is stored in the ink pack of the present invention onto a recording medium, and ($b^1$) a step of curing the ink composition by irradiating the ejected ink composition with ultraviolet rays. Here, the ink pack of the present invention may be stored in the ink cartridge and used.

By including the above-described steps ($a^1$) and ($b^1$), the inkjet recording method of the present invention forms an image using the ink composition which is cured on the recording medium.

In the step ($a^1$) in the inkjet recording method of the present invention, it is possible to use the inkjet recording apparatuses which are described in detail below.

<Inkjet Recording Apparatus>

The inkjet recording apparatuses which are able to be used in the inkjet recording method of the present invention are not particularly limited and it is possible to arbitrarily select and use a well-known inkjet recording apparatus which is capable of achieving the desired resolution. That is, with known inkjet recording apparatuses including commercially available products, it is possible to perform ejection of the ink composition onto the recording medium in the step ($a^1$) of the inkjet recording method of the present invention.

An ink supply system is formed of, for example, an ink cartridge which includes the ink composition in an inner section, a supply pipe, an ink supply tank immediately before an inkjet head, a filter and a piezo-type inkjet head. It is possible to drive the piezo-type inkjet head so as to be able to eject multi-size dots of preferably 1 to 100 pl and more preferably 8 to 30 pl, at a resolution of preferably 320×320 to 4,000×4,000 dpi, more preferably 400×400 to 1,600×1,600 dpi, and even more preferably 720×720 dpi. Here, the dpi in the present invention represents the number of dots per 2.54 cm.

As described above, with ultraviolet curable type ink compositions such as the ink composition which is used in the present invention, since it is desirable to set the ejected ink to a constant temperature, it is possible to perform thermal insulation and heating from the ink supply tank up to the inkjet head. The methods of temperature control are not particularly limited; however, for example, it is preferable to provide a plurality of temperature sensors in sites at each pipe, and perform heating control according to the flow amount of the ink and the temperature of the environment. The temperature sensors can be provided in the vicinity of the nozzles of the ink supply tank and the inkjet head. In addition, the head unit to be heated is preferably thermally blocked or insulated in order that the apparatus main body is not influenced by the temperature from the outside air. In order to shorten the start-up time of the printer required for heating, or in order to reduce the thermal energy loss, it is preferable to provide insulation from other sites and to decrease the heat capacity of the entire heating unit.

The ejection of the ink composition using the above-described inkjet recording apparatus is preferably performed after heating the ink composition to preferably 25 to 80° C., more preferably 25 to 50° C. and reducing the viscosity of the ink composition to preferably 3 to 15 mPa·s, more preferably 3 to 13 mPa·s. In particular, when an ink composition where the viscosity of the ink at 25° C. is 50 mPa·s or less is used as the ink composition, it is possible to suitably perform the ejection, which is preferable. By using this method, it is possible to realize high ejection stability.

Ultraviolet curable type ink compositions such as the ink composition of the present invention have large changes in viscosity due to temperature changes during ejection since the viscosity is generally higher than aqueous ink compositions which are used in ink compositions for normal inkjet recording. The changes in the viscosity of the ink composition greatly influence changes in the droplet size and changes in the droplet ejection speed, and can lead to deterioration of the image quality. Accordingly, there is a need to keep the temperature of the ink composition at the time of ejection constant as much as possible. Thus, in the present invention, it is suitable that the control band of the temperature of the ink composition be preferably ±5° C. from a set temperature, more preferably ±2° C., and even more preferably ±1° C.

Next, description will be given of the ($b^1$) step of irradiating the ejected ink composition with ultraviolet rays and curing the ink composition.

The ink composition which is ejected onto the target recording medium is cured by the irradiation of ultraviolet rays. This is because, for example, the photopolymerization initiator which is included in the ink composition is dissolved by the irradiation of the ultraviolet rays, an initiating species such as a radical, acid, base, or the like is generated, and the polymerization reaction of the polymerizable compound is started and promoted by the functions of the initiating species. At this time, if a photopolymerization initiator and a sensitizer are present in the ink composition, the sensitizer in the system absorbs ultraviolet rays and enters an excited state, the dissolution of the polymerization initiator is promoted by the contact with the polymerization initiator, and it is possible to achieve a curing reaction with higher sensitivity.

The peak wavelength of ultraviolet light depends on the absorption characteristics of the photopolymerization initiator or the sensitizer; however, for example, 300 to 450 nm is preferable, and 350 to 420 nm is more preferable.

In addition, in the present invention, the polymerization initiation system of the ink composition has sufficient sensitivity even with low-output ultraviolet rays. Therefore, the curing is suitably performed with an exposure surface illumination of preferably 10 to 4,000 mW/cm$^2$, more preferably 20 to 2,500 mW/cm$^2$.

As the light source which is used to cure the ultraviolet curable type inkjet ink composition, mercury lamps, and metal halide lamps are widely known. However, currently, a move toward becoming mercury free is strongly desirable from the viewpoint of protecting the environment and replacement with GaN-based semiconductor ultraviolet light emitting devices is extremely effective, industrially and environmentally. In addition, LED (UV-LED) and LD (UV-LD) are compact, have a long life, high efficiency, and low cost and are anticipated as light sources for photocurable type inkjets.

In addition, it is possible to use light emitting diodes (LED) and laser diodes (LD) as the active radiation source. In particular, in a case where an ultraviolet light source is necessary, it is possible to use an ultraviolet LED and an ultraviolet LD. For example, Nichia Corporation has launched an ultraviolet LED which has a wavelength in which the main emission spectrum is between 365 nm and 420 nm. Furthermore, in a case where an even shorter wavelength is necessary, the specification of U.S. Pat. No. 6,084,250A discloses an LED capable of emitting ultraviolet rays placed in the center between 300 nm and 370 nm. In addition, other ultraviolet LEDs are available and able to irradiate radiation of different ultraviolet ray bands. In the present invention, UV-LEDs are particularly preferable active ray sources, and a UV-LED which has a peak wavelength of 350 to 420 nm is particularly preferable.

Here, the maximum illuminance of the LED on the target recording medium is preferably 10 to 2,000 mW/cm$^2$, more preferably 20 to 1,000 mW/cm$^2$, and particularly preferably 50 to 800 mW/cm$^2$.

The ink composition of the present invention is suitably irradiated by such ultraviolet rays for preferably 0.01 to 120 seconds and more preferably 0.1 to 90 seconds.

The irradiation conditions of the active energy rays and the basic irradiation method are disclosed in JP1985-132767A (JP-S60-132767A). Specifically, light sources are provided on both sides of the head unit which includes the ejection apparatus of the ink composition and are operated by scanning the head unit and the light sources using a so-called shuttle system. The irradiation of the active energy rays is performed in a fixed time (preferably 0.01 to 0.5 seconds, more preferably 0.01 to 0.3 seconds, and even more preferably 0.01 to 0.15 seconds) after the landing of the ink composition. By controlling the time from the landing of the ink composition to the irradiation in this manner to be an extremely short time, it is possible to prevent the ink composition which is landed on the target recording medium from blurring before curing. In addition, since it is possible to perform exposure before the ink composition penetrates to a deep portion which the light source does not reach even with respect to a porous target recording medium, it is possible to suppress the residue of the unreacted monomer, which is preferable.

Furthermore, the curing may be completed by another light source unaccompanied by driving. In addition, examples of the irradiation method include a method which uses optical fibers or a method where collimated light (ultraviolet light) is irradiated onto a mirror surface and the reflected light is irradiated back to the recording section. It is possible for such curing methods to also be applied to the inkjet recording method of the present invention.

By adopting the inkjet recording method as described above, it is possible to keep a constant dot diameter in the landed ink with respect to various recording media with different degrees of surface wettability, and the image quality is improved. Here, in order to obtain a color image, it is preferable to superimpose colors in order from colors with low brightness. By superimposing the colors in order from colors with low brightness, it is possible to anticipate that the irradiated rays will more easily reach the ink in the lower portion, that the curing sensitivity will be favorable, that the remaining monomers will be reduced, and that the adhesion will improve. In addition, with the irradiation, all the colors can be ejected and exposed together; however, exposing one color at a time is preferable from the viewpoint of curing promotion.

In this manner, by curing the ink composition of the present invention with high sensitivity using the irradiation of ultraviolet rays, it is possible to form an image on the recording medium surface.

In the present invention, the recording medium is not particularly limited; however, it is possible to use a well-known recording medium as the support body or the recording material. For example, examples include paper, paper laminated with plastic (for example, polyethylene, polypropylene, polystyrene, or the like), metal plates (for example, aluminum, zinc copper, or the like), plastic films (for example, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, or the like), paper or plastic films where the above-described metals are laminated or vapor-deposited, and the like. In addition, as the recording medium of the present invention, it is possible to suitably use a non-absorbing recording medium.

EXAMPLES

Examples and Comparative Examples are shown below, whereby the present invention will be more specifically described. However, the present invention is not limited by these Examples. Here, the "parts" in the following description indicate "parts by mass" unless otherwise noted and "%" indicates "mass %".

<Preparation of Cyan Dispersion>

59 parts of monomer (NPGPODA, propoxylated (2) neopentyl glycol diacrylate (compound where a neopentyl glycol propylene oxide 2 mol adduct is diacrylated) manufactured by Sartomer Japan Ltd. SR9003), 10 parts of pigment dispersing agent Solsperse 32000 (polymer dispersing agent manufactured by Noveon, Inc.), and 1 part of polymerization inhibitor UV 12 (FLORSTAB UV 12, nitroso-based polymerization inhibitor, manufactured by Kromachem Co., Ltd.) were mixed and stirred, after that, 30 parts of cyan pigment Irgalite Blue GLVO (Pigment Blue 15:4, copper phthalocyanine, manufactured by Ciba Japan Co., Ltd.) were added thereto and stirred to obtain a crude dispersion. Next, the crude dispersion was added to a disperser motor M50 (manufactured by Eiger Co., Ltd.) and dispersion was performed for 4 hours at a peripheral speed of 9 m/s using zirconia beads having a diameter of 0.65 mm to obtain a cyan dispersion.

<Preparation of Ink Compositions>

The ink compositions of Examples 1 to 10 and Comparative Examples 1 to 6 were each obtained by mixing and stirring the above-described cyan dispersion with monomers, photopolymerization initiators, stabilizers, and oligomers described in FIG. 1, and performing filtration using a 10 micron filter. The preparation of the ink composition was all performed under a yellow light.

<Sealing in Ink Pack>

Regarding the layer configuration of the sheet of ink pack, the ink contact surface (the inside) is a polyethylene layer which has a film thickness of 100 microns, an aluminum layer which has a film thickness of 10 microns is laminated onto the polyethylene layer, a polyamide layer which has a film thickness of 20 microns is laminated onto the aluminum layer, and the polyamide layer configures the outer surface of the ink pack (the outside). Between each of the layers, a layer with a thickness of 5 microns was formed by coating an adhesive agent. Two sample sheets having a long side of 50 cm and a short side of 7 cm were cut out from the above described sheet, and were overlapped each other so as to face the polyethylene layers. And, firstly, the long side (138 and 139 in FIG. 1) of the obtained laminate was heat sealed with a width of 5 mm. The heat sealing was performed using a sealer FiK-300 manufactured by Fuji Impulse Co., Ltd. Next, a liquid supply unit (134 in FIG. 1) made of high density polyethylene was attached and the short side (135 in FIG. 1) of the obtained laminate was heat sealed.

500 ml of each ink composition of Examples 1 to 10 and Comparative Examples 1 to 6 was introduced through the short side (136 in FIG. 1), the short side 136 was heat sealed such that air did not enter, and each of the ink packs (133 in FIG. 1) of Examples 1 to 10 and Comparative Examples 1 to 6 was obtained.

<Oxygen Amount Measurement>

The measurement of the oxygen content was performed using a gas chromatography analyzer GC393 (manufactured by GL Sciences Inc.). A molecular sieve 5A was filled in the column, helium gas was made to flow as a carrier gas, and the column temperature was set to 40° C. 10 microliters of the ink composition were extracted from the liquid supply unit (134 in FIG. 1) of the ink pack with a syringe with an injection needle and were introduced into the column, and the oxygen amount was measured using a thermal conductivity detector (TCD) after separating the oxygen and nitrogen. The measurement was performed after one day and after 35 days of being sealed in the ink pack.

<ESR Measurement>

Each of the ink compositions of Example 1 to 10 and Comparative Examples 1 to 6 sealed in each of the ink packs was sampled with the syringe with an injection needle from the liquid supply units (134 of FIG. 1) of the ink packs, and the samples were poured into a synthetic quartz tube for ESR and the synthetic quartz tube was sealed.

The spin number of the nitroxyl radical was quantified using an electron spin resonance apparatus (EMX) manufactured by BRUKER Co., Ltd.

<Curability Evaluation>

An inkjet image was printed on a polyvinyl chloride base material (Avery permanent 400, manufactured by Avery Co., Ltd.) using a ultraviolet curable type inkjet printer Acuity LED 1600 (manufactured by Fujifilm Graphic Systems Co., Ltd.).

A 100% solid image was formed under conditions of a resolution of 600×500 dpi and the coated film was pressed with normal paper just after the printing to evaluate curability. The case where there was no transfer of ink was evaluated as 1 and the case where ink was transferred to a part of the normal paper side due to poor curing was evaluated as 2.

<Character Reproducibility>

An inkjet image was printed on a polyvinyl chloride base material (Avery permanent 400, manufactured by Avery Co., Ltd.) using a ultraviolet curable type inkjet printer Acuity LED 1600 (manufactured by Fujifilm Graphic Systems Co., Ltd.). The scanning speed of the head was 1.2 m per second. A 4 point character "p" in Gothic type was printed under bidirectional printing conditions of a resolution of 600×500 dpi to observe occurrence of disruption to the outline of the character. Observation was performed with a magnifying glass. the case with no mist or variation in the landing position and a clear outline was evaluated as 1 and the case where dots caused by the generation of mist or dots due to shifting of the landing position were present in the circle of the "p" was evaluated as 2.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Spin number of the nitroxyl radical in 1 ml of ink after | $2.8 \times 10^{19}$ | $1.0 \times 10^{19}$ | $2.9 \times 10^{19}$ | $2.8 \times 10^{19}$ | $2.9 \times 10^{19}$ | $1.0 \times 10^{18}$ | $1.0 \times 10^{17}$ | $1.8 \times 10^{19}$ | $1.2 \times 10^{16}$ |

TABLE 1-continued

|  |  |  |  |  |  |  |  |  |  |  |
|---|---|---|---|---|---|---|---|---|---|---|
| one day being sealed in ink pack |  |  |  |  |  |  |  |  |  |  |
| Monomer | NVC | 24.0 | 24.0 | 24.0 | 14.0 | 14.0 | 21.9 | 21.9 | 24.0 | 24.3 |
|  | NIPAM | — | — | — | 10.0 | 10.0 | — | — | — | — |
|  | EOTMPTA | 3.0 | 3.0 | 6.4 | 3.0 | 6.4 | 3.0 | 3.0 | 3.0 | 3.0 |
|  | CTFA | 47.0 | 47.0 | 49.0 | 47.0 | 49.0 | 49.0 | 49.0 | 47.0 | 46.9 |
|  | TMPTA | 5.0 | 5.0 | 5.4 | 5.0 | 5.4 | 7.0 | 7.0 | 5.0 | 5.0 |
|  | IBOA | — | — | — | — | — | — | — | — | — |
| Oligomer | CN964 A85 | 4.0 | 4.0 | 5.0 | 4.0 | 5.0 | 4.0 | 4.0 | 4.0 | 4.0 |
| Photopolymerization initiator | Irgacure 819 | — | 3.2 | — | — | — | — | — | 3.2 | 3.2 |
|  | Darocur TPO | 6.0 | 2.8 | 6.7 | 6.0 | 6.7 | 6.0 | 6.0 | 2.8 | 2.8 |
|  | ITX | 2.0 | 2.0 | 0.4 | 2.0 | 0.4 | 2.0 | 2.0 | 2.0 | 2.0 |
|  | Irgacure 184 | — | — | 1.6 | — | 1.6 | — | — | — | — |
| Polymerization inhibitor | TINUVIN 770 DF | — | — | — | — | — | — | — | 0.3 | — |
|  | HO-TEMPO | 0.3 | 0.3 | 0.3 | 0.3 | 0.3 | 0.1 | 0.05 | — | 0.05 |
|  | UV-12 | — | — | — | — | — | — | — | — | — |
|  | Irganox 1010 | — | — | — | — | — | — | — | — | — |
|  | MEHQ | — | — | — | — | — | — | — | — | — |
| Mill base | NPGPODA | 5.1 | 5.1 | 0.7 | 5.1 | 0.7 | 4.0 | 4.0 | 5.1 | 5.1 |
|  | Irgalite Blue GLVO | 2.6 | 2.6 | 0.3 | 2.6 | 0.3 | 2.0 | 2.0 | 2.6 | 2.6 |
|  | Solsperse 32000 | 0.9 | 0.9 | 0.1 | 0.9 | 0.1 | 0.9 | 0.9 | 0.9 | 0.9 |
|  | UV12 | 0.1 | 0.1 | 0.1 | 0.1 | 0.1 | 0.1 | 0.1 | 0.1 | 0.1 |
| Total (mass parts) |  | 100.0 | 100.0 | 100.0 | 100.0 | 100.0 | 100.0 | 100.0 | 100.0 | 100.0 |
| Amount of oxygen after one day being sealed in ink pack (mg/ml) |  | 23 | 23 | 23 | 23 | 23 | 23 | 23 | 23 | 23 |
| Amount of oxygen after 35 days being stored (mg/ml) |  | 11 | 10 | 18 | 11 | 18 | 15 | 18 | 15 | 19 |
| Curability |  | 1 | 1 | 1 | 1 | 1 | 1 | 1 | 1 | 1 |
| Printer character reproducibility (4 point font) |  | 1 | 1 | 1 | 1 | 1 | 1 | 1 | 1 | 1 |

|  |  | Example 10 | Comparative Example 1 | Comparative Example 2 | Comparative Example 3 | Comparative Example 4 | Comparative Example 5 | Comparative Example 6 |
|---|---|---|---|---|---|---|---|---|
| Spin number of the nitroxyl radical in 1 ml of ink after one day being sealed in ink pack |  | $2.0 \times 10^{18}$ | $1.0 \times 10^{16}$ | $6.0 \times 10^{19}$ | 0.0 | 0.0 | 0.0 | 0.0 |
| Monomer | NVC | — | 24.3 | 24.0 | 24.0 | 24.0 | 24.0 | 24.0 |
|  | NIPAM | — | — | — | — | — | — | — |
|  | EOTMPTA | 3.0 | 3.0 | 3.0 | 3.0 | 3.0 | 3.0 | 3.0 |
|  | CTFA | 46.9 | 47.0 | 46.7 | 47.0 | 47.0 | 47.0 | 47.0 |
|  | TMPTA | 10.0 | 5.0 | 5.0 | 5.0 | 5.0 | 5.0 | 5.0 |
|  | IBOA | 18.3 | — | — | — | — | — | — |
| Oligomer | CN964 A85 | 4.0 | 4.0 | 4.0 | 4.0 | 4.0 | 4.0 | 4.0 |
| Photopolymerization initiator | Irgacure 819 | 3.2 | 3.2 | 3.2 | 3.2 | — | — | — |
|  | Darocur TPO | 2.8 | 2.8 | 2.8 | 2.8 | 6.0 | 6.0 | 6.0 |
|  | ITX | 3.0 | 2.0 | 2.0 | 2.0 | 2.0 | 2.0 | 2.0 |
|  | Irgacure 184 | — | — | — | — | — | — | — |
| Polymerization inhibitor | TINUVIN 770 DF | — | — | — | — | — | — | — |
|  | HO-TEMPO | 0.1 | 0.01 | 0.6 | — | — | — | — |
|  | UV-12 | — | — | — | 0.3 | 0.3 | — | — |
|  | Irganox 1010 | — | — | — | — | — | 0.3 | — |
|  | MEHQ | — | — | — | — | — | — | 0.3 |
| Mill base | NPGPODA | 5.1 | 5.1 | 5.1 | 5.1 | 5.1 | 5.1 | 5.1 |
|  | Irgalite Blue GLVO | 2.6 | 2.6 | 2.6 | 2.6 | 2.6 | 2.6 | 2.6 |
|  | Solsperse 32000 | 0.9 | 0.9 | 0.9 | 0.9 | 0.9 | 0.9 | 0.9 |
|  | UV12 | 0.1 | 0.1 | 0.1 | 0.1 | 0.1 | 0.1 | 0.1 |
| Total (mass parts) |  | 100.0 | 100.0 | 100.0 | 100.0 | 100.0 | 100.0 | 100.0 |
| Amount of oxygen after one day being sealed in ink pack (mg/ml) |  | 25 | 23 | 23 | 24 | 24 | 25 | 25 |
| Amount of oxygen after 35 days being stored (mg/ml) |  | 20 | 21 | 9 | 7 | 8 | 22 | 23 |
| Curability |  | 1 | 1 | 2 | 1 | 1 | 1 | 1 |
| Printer character reproducibility (4 point font) |  | 1 | 2 | 1 | 2 | 2 | 2 | 2 |

Here, each of the components which are described in the above Table 1 is as follows.

NVC: N-vinyl caprolactam (manufactured by BASF Corp.)

NIPAM: N-isopropyl acrylamide (manufactured by Kohjin Co., Ltd.)

EOTMPTA: ethoxylated (3) trimethylolpropane triacrylate (compound where trimethylolpropane ethylene oxide 3 mol adduct is triacrylated) (SR454 D NS, manufactured by Sartomer Japan Co., Ltd.)

CTFA: cyclic trimethylolpropane formal acrylate (SR531, manufactured by Sartomer Japan Co., Ltd.)

TMPTA: trimethylol propane triacrylate (SR351S, manufactured by Sartomer Japan Co., Ltd.)

IBOA: isobornyl acrylate (IBXA, manufactured by Osaka Organic Chemical Industry Co., Ltd.)

CN964A85 (urethane acrylate oligomer, average number of functional groups is 2, manufactured by Sartomer Japan Co., Ltd.)

Irgacure 819: bis(2,4,6-trimethyl benzoyl)phenyl phosphine oxide (IRGACURE 819, manufactured by Ciba Japan Co., Ltd.)

Darocur TPO: 2,4,6-trimethyl benzoyl diphenyl phosphine oxide (DAROCUR TPO, manufactured by Ciba Japan Co., Ltd.)

ITX: isopropylthioxanthone (manufactured by Lamb son Co., Ltd.)

Irgacure 184: 1-hydroxy cyclohexyl phenyl ketone (manufactured by Chiba, Japan Co., Ltd.)

TINUVIN 770 DF: sebacic acid bis(2,2,6,6-tetramethyl-4-piperidyl) (hindered amine compound, manufactured by Ciba Japan Co., Ltd.)

HO-TEMPO: 4-hydroxy-2,2,6,6-tetramethylpiperidinyloxy manufactured by Adeka Co., Ltd.

UV12 (FLORSTAB UV12, nitroso-based polymerization inhibitor, tris (N-nitroso-N-phenylhydroxylamine)aluminum salt, manufactured by Kromachem Co., Ltd.)

Irganox 1010: hindered phenolic-based polymerization inhibitor (manufactured by Chiba Japan Co., Ltd.)

MEHQ: methoxy hydroquinone (manufactured by Wako Pure Chemical Industries, Ltd.)

This application claims priority under 35 U.S.C. §119 of Japanese Patent application JP 2012-192606, filed on Aug. 31, 2012, the entire contents of which are hereby incorporated by reference.

What is claimed is:

1. An ink pack, wherein an ultraviolet curable type inkjet ink composition which contains a compound having a nitroxyl radical, and has $1.2 \times 10^{16}$ to $3.0 \times 10^{19}$ of a spin number of the nitroxyl radical in one milliliter of the ink composition, is sealed in a pack where at least one layer of an aluminum layer or an aluminum alloy layer and at least one layer of a plastic layer are laminated, wherein the ink composition includes at least one of compound selected from a group consisting of N-vinyl lactams and (meth)acrylamides, and the compound having the nitroxyl radical in the ink composition includes 4-hydroxy-2,2,6,6-tetramethyl piperidinyl-N-oxyl.

2. The ink pack according to claim 1, wherein the ink composition includes an acyl phosphine-based photopolymerization initiator.

3. The ink pack according to claim 1, wherein the content of the 4-hydroxy-2,2,6,6-tetramethyl piperidinyl-N-oxyl in the ink composition is 0.05 to 1 mass % with respect to the total mass of the ink composition.

4. The ink pack according to claim 1, wherein a material of a surface in direct contact with the ink composition of the ink pack is polypropylene or polyethylene.

5. The ink pack according to claim 1, wherein an average oxygen amount in one milliliter of the ink composition after the ink composition is sealed in the ink pack for 1 day is 35.mu.g or less.

6. The ink pack according to claim 1, wherein the ink composition includes copper phthalocyanine.

7. The ink pack according to claim 1, which is an oxygen impermeable ink pack.

8. The ink pack according to claim 1, wherein the ink composition includes a compound represented by the following Formula (b-2),

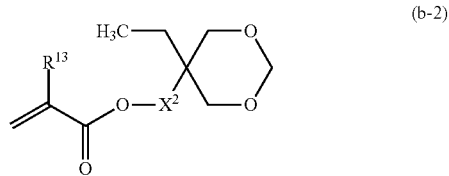

in the Formula (b-2), $R^{13}$ represents a hydrogen atom or a methyl group, and $X^2$ represents a single bond or a divalent linking group.

9. The ink pack according to claim 1, wherein the ink composition includes N-vinyl caprolactam.

10. The ink pack according to claim 1, wherein the ink composition includes at least one of compound selected from a group consisting of N-vinyl caprolactam and N-isopropyl acrylamide.

11. The ink pack according to claim 10, wherein the total content of the N-vinyl caprolactam and N-isopropyl acrylamide in the ink composition is 15 mass % or more with respect to the total mass of the ink composition.

12. The ink pack according to claim 1, wherein an average oxygen amount in one milliliter of the ink composition after the ink composition is sealed in the ink pack and stored at 20.degree. C. to 30.degree. C. for 30 days or more is 20.mu.g or less.

13. The ink pack according to claim 12, wherein an average oxygen amount in one milliliter of the ink composition after the ink composition is sealed in the ink pack for 1 day is 35.mu.g or less.

14. The ink pack according to claim 1, wherein the ink composition includes an oligomer.

15. The ink pack according to claim 14, wherein the oligomer is urethane (meth)acrylate.

* * * * *